United States Patent
Capoldi et al.

(10) Patent No.: US 9,989,090 B2
(45) Date of Patent: Jun. 5, 2018

(54) SLEWING ROLLER BEARING WITH SEALING ARRANGEMENT

(71) Applicants: Aktiebolaget SKF, Gothenburg (SE); SKF Australia Pty Ltd, Bathurst (AU)

(72) Inventors: Bruno Capoldi, Charentenay (FR); Lionel Martin, Welshpool (AU); Eric Robba, Domecy sur Cure (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days. days.

(21) Appl. No.: 15/609,500

(22) Filed: May 31, 2017

(65) Prior Publication Data

US 2017/0356491 A1 Dec. 14, 2017

(30) Foreign Application Priority Data

Jun. 8, 2016 (DE) .......................... 10 2016 210 101

(51) Int. Cl.
| | |
|---|---|
| *F16C 33/78* | (2006.01) |
| *F16C 29/08* | (2006.01) |
| *F16C 19/14* | (2006.01) |
| *F16C 33/10* | (2006.01) |

(52) U.S. Cl.
CPC .............. *F16C 29/08* (2013.01); *F16C 19/14* (2013.01); *F16C 33/1005* (2013.01); *F16C 33/7886* (2013.01)

(58) Field of Classification Search
CPC .... F16C 19/34; F16C 19/545; F16C 2300/14; F16C 33/7886
See application file for complete search history.

(56) References Cited

U.S. PATENT DOCUMENTS

| | | | | |
|---|---|---|---|---|
| 5,957,000 | A * | 9/1999 | Pecorari | F16C 33/78 74/425 |
| 8,002,472 | B2 * | 8/2011 | Craig | F16C 19/52 384/455 |
| 8,212,372 | B2 * | 7/2012 | Fujioka | F16J 15/002 290/44 |
| 2012/0068413 | A1 * | 3/2012 | Putt | F16C 33/7886 277/306 |
| 2015/0362009 | A1 * | 12/2015 | Kaesler | F16C 19/381 384/455 |

FOREIGN PATENT DOCUMENTS

FR 2694610 B1 * 10/1994 ............ F16C 19/166

* cited by examiner

*Primary Examiner* — Thomas R Hannon
(74) *Attorney, Agent, or Firm* — Bryan Peckjian; SKF USA Inc. Patent Dept.

(57) ABSTRACT

A slewing bearing providing a first ring, a second ring, the rings being concentric around a central axis (X1), at least one row of rolling elements arranged between the rings in order to form an axial thrust that can transmit axial forces, at least one row of rolling elements arranged between the rings in order to form a radial thrust that can transmit radial forces, and at least one sealing assembly arranged between the first ring and the second ring. The sealing assembly provides first sealing means being arranged outside second sealing means, an annular sealed chamber being defined between the first sealing means and second sealing means.

9 Claims, 2 Drawing Sheets

SLEWING ROLLER BEARING WITH SEALING ARRANGEMENT

CROSS REFERENCE TO RELATED APPLICATIONS

This application claims priority to German patent application no. 102016210101.3 filed on 6 Aug. 2016, the contents of which are fully incorporated herein by reference.

FIELD OF THE INVENTION

The invention relates to the field of roller bearings, in particular roller bearings of large diameter for use in mining extraction machines, tunnel boring machines such as a tunneler, a wind turbine or any other rotating applications of large dimensions.

BACKGROUND OF THE INVENTION

Roller bearings typically provide an inner ring, an outer ring and at least two rows of rolling elements, such as rollers, arranged between the rings. Roller bearings of large diameter are generally loaded both radially and axially with relatively large loads. In this case, reference is made to an orientation roller bearing or slewing roller bearing.

Patent application FR-A1-2 694 610 describes a slewing roller bearing providing three row of rollers arranged between the inner and outer rings, and wherein two rows make it possible to withstand axial forces. The third row of rollers makes it possible to withstand radial forces, and is arranged between the cylindrical outer surface of the inner ring, and a groove formed in the bore in the outer ring. Slewing roller bearing are used in aggressive environments and further provides sealing elements to prevent exterior elements, such as dust, metal particles or water, from getting inside the bearing and damaging its components. A first sealing element is fixed to the inner ring and provides a sealing lip in sliding contact with the outer ring. A second sealing element is fixed to the outer ring and provides a sealing lip in sliding contact with the inner ring.

However, such sealing elements with only one lip are not sufficient to prevent the entry of water under high pressure flow, particularly during the bearing cleaning.

To further improve this seal-tightness and increase the life of the annular seal, it has already been proposed to provide an annular protective cover on top of the seal, generally of L-shaped section, the radial branch of which has an inner portion inserted into a peripheral groove of the inner ring of the bearing. This cover is fixed using pins which are inserted into inclined holes formed in the inner ring of the bearing, from points outside the cover, and which pass through this inner portion.

However, this arrangement is axially bulky and is complicated to implement. Furthermore, it presents a difficulty associated with the accessibility of the pins in view of the surrounding parts of the machine, if it presents a need to dismantle the cover for a cleaning or seal change service, for example, or to reassemble the cover.

It is therefore desirable that a slewing roller bearing provides effective sealing elements that prevent the entry of exterior element, particularly in aggressive environment, and easy to implement.

BRIEF SUMMARY OF THE INVENTION

The aim of the invention is to solve the above difficulties.

It is proposed a sealed slewing roller bearing of reduced costs of installation, use and maintenance, and with a longer service life.

To this end, the invention relates to a slewing bearing providing a first ring, a second ring, the rings being concentric around a central axis, at least one row of rolling elements arranged between the rings in order to form an axial thrust which can transmit axial forces, and at least one row of rolling elements arranged between the rings in order to form a radial thrust which can transmit radial forces. The slewing bearing further provides at least one sealing assembly arranged between the first ring and the second ring.

According to the invention, the sealing assembly provides first sealing means with an annular seal support ring being fixed on a first sealing surface of first ring, and a sealing element providing at least one outer annular seal lip and being housed in a groove provided on the seal support ring, the seal lip resting on a contact ring provided on a second sealing surface of second ring. The sealing assembly further provides second sealing means with at least one inner annular seal lip being housed in a groove provided on the second sealing surface of second ring and resting on the first sealing surface of first ring. The first sealing means are arranged outside second sealing means, an annular sealed chamber being defined between the first sealing means and second sealing means.

According to further aspects of the invention which are advantageous but not compulsory, such a slewing bearing may incorporate one or several of the following features:

The sealing element of the first sealing means is made of rubber, for example nitrile butadiene rubber (NBR).

The seal lip of the second sealing means is made of rubber, for example nitrile butadiene rubber (NBR).

The seal support ring is made of rolled steel.

The seal support ring provides an annular support base providing first end fixed to the first ring and second end providing the groove wherein is arranged the sealing element.

The seal support ring provides at least one adjusting means providing a contact surface resting against the first sealing surface so as to adjust the position of the seal support ring in a first direction with respect to the first ring.

The seal support ring provides at least one adjusting means housed in a groove provided to the first sealing surface so as to adjust the position of the seal support ring in a second direction with respect to the first ring.

Adjusting means are continuously annular.

Adjusting means are discontinuous and provide a plurality of circumferentially spaced portions.

Adjusting means are provided to the first end fixed to the first ring.

The seal support ring is fixed to the first ring by welding.

The seal support ring is fixed to the second ring by threaded screws passing through holes provided on the seal support ring, the screws cooperating with corresponding threaded holes provided on first sealing surface of the first ring.

Seal support ring is fixed to the first ring by fixing means provided to the adjusting means resting against the first sealing surface.

The through holes are provided on the adjusting portion of the seal support ring.

The contact ring is fixed to the second ring by welding.

The contact ring is fixed to the second ring by threaded screws passing through holes provided on the contact ring, the screws cooperating with corresponding threaded holes provided on second sealing surface of the second ring.

The contact ring is made of carbon steel.

The annular sealed chamber defined between the first sealing means and the second sealing means provides lubricant.

An annular sealing ring is housed between the contact ring and the second sealing surface of second ring.

The first ring is an outer ring and the second ring is an inner ring.

Rolling elements arranged between the inner and outer rings and forming an axial thrust are rollers.

Rolling elements arranged between the inner and outer rings and forming a radial thrust are rollers.

BRIEF DESCRIPTION OF THE SEVERAL
VIEWS OF THE DRAWING

The invention will now be explained in correspondence with the annexed figures, as illustrative examples, without restricting the object of the invention. In the annexed figures.

DETAILED DESCRIPTION OF THE
INVENTION

Figure 1:
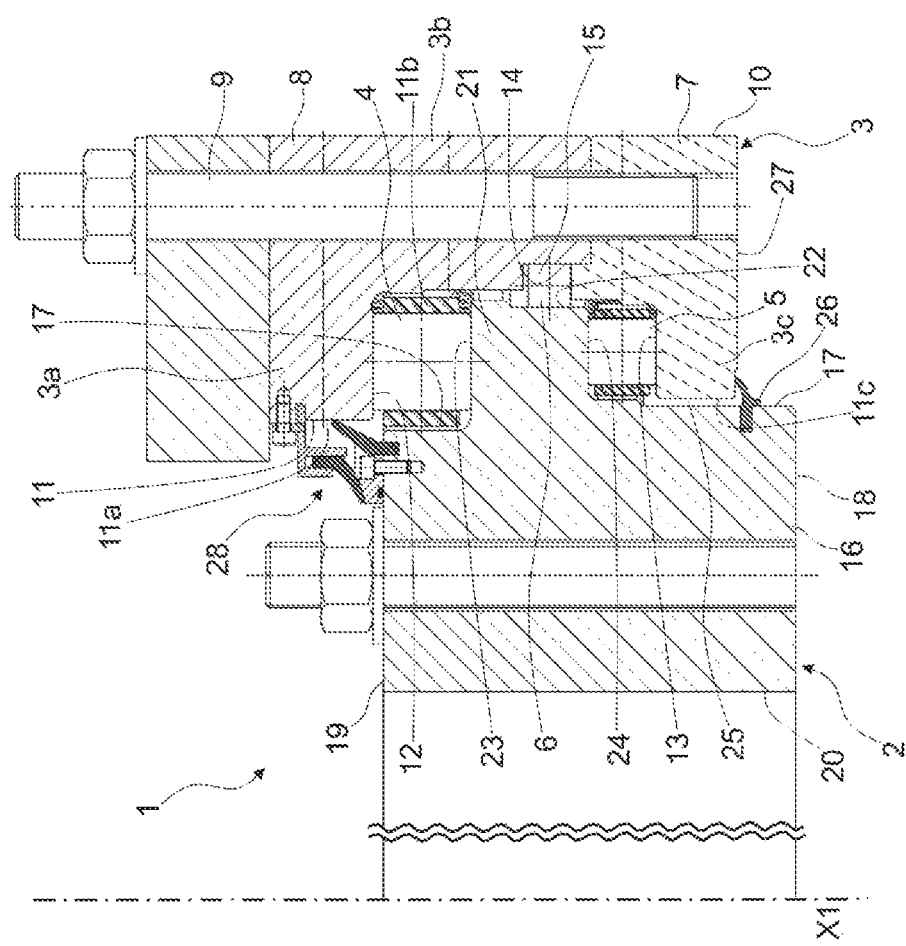
FIG. 1 is a sectional view of a slewing roller bearing according to a first embodiment of the invention.

FIG. 1 shows a slewing roller bearing 1 with a large diameter which can be used in particular in tunnel boring machines such as a tunneler, a wind turbine or any other rotating applications of large dimensions.

The slewing roller bearing 1 with a central axis X1 provides an inner ring 2, an outer ring 3, two rows of rollers 4, 5 arranged between the rings 2, 3 in order to form an axial thrust which can transmit axial forces, and one row of rollers 6 arranged between the the rings 2, 3 in order to form a radial thrust which can transmit radial forces.

Hereinafter, the adjectives "axial" and "radial" are defined relative to the central axis X1 of the slewing roller bearing 1.

The inner ring 2 and the outer ring 3 are concentric, and extend axially along the axis of rotation X1 of bearing 1.

As one embodiment, the outer ring 3 is made of two main parts 7, 8 which are assembled to one another by any appropriate means, for example by being bolted together by a plurality of circumferentially spaced threaded rods 9.

The outer ring 3 provides a cylindrical outer surface 10 and a stepped bore 11 on which there are formed first, second and third raceways 12, 13 and 14 respectively. The outer ring 3 has a C-shape with an upper annular radial portion 3a, a cylindrical portion 3b and a lower annular radial portion 3c, the stepped bore 11 defining a first, second and third bore portions 11a, 11b and 11c, respectively.

The first raceway 12 is provided to the upper radial portion 3a. Raceway 12 is in the form of an annular radial surface which is in linear contact with rollers 4. The radial raceway 12 is extended, at the level of an edge with a large diameter, by the cylindrical axial bore portion 11b of the stepped bore 11 which delimits locally the third raceway 14.

The third raceway 14 is provided to the cylindrical portion 3b. Raceway 14 is arranged in a groove 15 formed in the bore portion 11b and extends radially towards the exterior of the bearing 1. The base of the groove 15 is offset radially towards the exterior relative to the bore portion 11b, and forms the third raceway 14. The axial raceway 14 is in the form of an annular axial surface which is in linear contact with rollers 6.

The bore portion 11b is extended radially, on the side opposite to the first raceway 12, by the lower radial portion 3c. Second raceway 13 is provided to the radial portion 3c and is in the form of an annular radial surface in linear contact with rollers 5.

The inner ring 2 provides a cylindrical annular body 16 radially delimited by a cylindrical bore 20 and an outer cylindrical surface 17, and axially delimited by two opposite lateral radial surfaces 18, 19. The cylindrical bore 20 is provided is designed to cooperate with a corresponding structure or machine or frame (not represented).

The cylindrical annular body 16 provides an outwardly projecting portion 21. The portion 21 protrudes radially from the outer cylindrical surface 17 towards the outer ring 3. Portion 21 is axially arranged between the radial portions 3a and 3c of the outer ring 3. The portion 21 is radially delimited by an outer cylindrical surface 22 that is radially opposite to the third raceway 14 of outer ring 3, and forming an axial raceway for a row of rollers 6 radially arranged between the raceways 14 and 22. The portion 21 is axially delimited by an upper lateral radial surface 23 that is axially opposite to the first raceway 12 of outer ring 3, and forms a radial raceway for a row of rollers 4 axially arranged between the raceways 12 and 23. The portion 21 is further axially delimited by a lower radial surface 24 that is axially opposite to the second raceway 13 of outer ring 3, and forms a radial raceway for a row of rollers 5 axially arranged between the raceways 13 and 24.

The raceway 24 of outwardly projecting portion 21 and the lower lateral radial surface 18 of cylindrical annular body 16 are axially offset. The raceway 23 of outwardly projecting portion 21 and the upper lateral radial surface 19 of cylindrical annular body 16 are axially offset. The raceway 22 of outwardly projecting portion 21 and the outer cylindrical surface 17 of cylindrical annular body 16 are radially offset.

The bore portion 11b of the stepped bore 11 of outer ring 3 and the outer cylindrical surface 17 of inner ring 2 form radial abutments for the rollers 4 arranged between the raceways 12 and 23, and also form radial abutments for the rollers 5 arranged between the raceways 13 and 24.

The bore portion 11c of the lower radial portion 3c of outer ring 3 is radially facing the outer cylindrical surface 17 of the cylindrical annular body 16 of inner ring 2. The bore portion 11c and outer cylindrical surface 17 are radially spaced by a bottom inter-ring space 25. The inter-ring space 25 is sealed by a sealing lip 26 arranged between the inner ring 2 and the outer ring 3. The sealing lip 26 is continuously annular and provides a first end housed in an annular radial groove provided to the outer cylindrical surface 17. Sealing lip 26 provides a second free end in sliding contact with a lower lateral radial surface 27 of the outer ring 3. Such sealing lip 26 prevents exterior elements, such as dust, metal particles or water, from getting inside inter-ring space 25, hence inside slewing roller bearing 1 and damaging its components. The bottom side of the slewing roller bearing 1 is not subject to important constraints and such a single sealing lip 26 sufficiently seals this side of bearing 1.

On the axially opposite side, the slewing roller bearing 1 further provides a sealing assembly 28 facing heavy constraints, such as water under high pressure flow. Sealing assembly 28 according to a first embodiment of the invention is detailed in FIG. 2. Sealing assembly 28 is arranged between the upper lateral surface 19 of inner ring 2 and the bore portion 11a of outer ring 3, the upper lateral surface 19 and bore portion 11a being perpendicular one to the other and defining a top inter-ring space 37 between the rings 2, 3 in relative rotating movement.

Sealing assembly 28 provides first sealing means 29 and second sealing means 30, the first sealing means 29 being arranged inwardly outside the second sealing means 30.

First sealing means 29 provide an annular seal support ring 31 with an annular radial support base 32 with outer end 33 housed in a radial groove 34 provided on the bore portion 11a of outer ring 3. The support base 32 of seal support ring 31 is then axially adjusted with respect to the outer ring 3.

Outer end 33 further provides centering means 45 providing an annular axial portion extending axially from the support base 32 towards the opposite direction to the inner ring 2. Centering means 45 rest against the bore portion 11a of the outer ring 3 and radially centers the seal support ring 31 with respect to the outer ring 3. Alternatively, centering means 45 are discontinuous and provide a plurality of circumferentially spaced axial portions resting against the bore 11a of outer ring 3. In the illustrated embodiment of FIG. 2, the centering means 45 are axial and provide a plurality of radial through openings in which threaded screws 46 are arranged and cooperate with associated threaded holes 47 provided on the bore portion 11a.

Support base 32 further provides an inner end 35 provided with an axial groove 36 open towards the upper lateral surface 19 of the inner ring 2. Groove 36 is formed between two annular axial flanges 36a, 36b extending axially from the support base 32 towards the upper lateral surface 19 of inner ring 2.

The seal support ring 31 is made of rolled steel. Preferably, the parts of the ring 31 providing the flange 36b, the support base 32 provided with the flange 36a, and the centering means 45 are separately manufactured and assembled together. The parts are preferably secured by welding with each other.

First sealing means 29 further provide a sealing element 38 consisting in a seal lip. Lip 38 provides a first end housed in groove 36 of seal support ring 31. Lip 38 is then firmly fixed to the outer ring 3 by the intermediate of the ring 31. Attachment of the lip 38 with outer ring 3 can resist to water under high pressure. Lip 38 provides a second free end resting against a contact surface 40 of a contact ring 39 provided on the upper lateral surface 19 of inner ring 2. Lip 38 is preferably made of rubber, and more particularly of nitrile butadiene rubber (NBR).

Contact ring 39 is continuously annular and provides a fixing portion 41 to be fixed to the upper lateral surface 19 of inner ring 2 by any appropriate means. In the illustrated embodiment of FIG. 2, the fixing portion 41 is radial and provides a plurality of axial through holes in which threaded screws 42 are arranged and cooperate with associated threaded holes 43 provided on the upper lateral surface 19. An annular sealing ring 44 is further axially housed between the contact ring 39 and the upper lateral surface 19. Such contact ring 39 permits to reduce the axial distance between the seal lip 38 and the upper lateral surface 19 of inner ring 2. Then the axial distance in which water under high pressure can go through is reduced. Moreover, lip 38 is radially bent and even it slides against contact surface 40 towards the outer ring 3 under pressurized water jet, the length of the lip 38 is sufficient to maintain constant contact with the contact surface 40 and then to efficiently maintain the seal.

Contact ring 39 is advantageously made of carbon steel.

Sealing assembly 28 further provides second sealing means 30 which are housed in the first sealing assembly 29. Sealing means 30 consists in a seal lip. Lip 30 provides a first end housed in a groove 48 provided on the upper lateral surface 19 of inner ring 2. The groove 48 is radially offset towards the bore portion 11a of outer ring 3 relative to the contact ring 39. Lip 30 provides a second free end resting against the bore portion 11a of inner ring 3. The contact portion between the lip 30 and bore portion 11a is radially offset towards the outer lateral surface 19 of inner ring 2 relative to the seal support ring 31. Lip 30 is preferably made of rubber, and more particularly of nitrile butadiene rubber (NBR).

The first sealing means 29 are resistant to heavy external constraints and form a first sealing barrier for the slewing bearing 1. The second sealing means 30 permit to stop potential residual entries that pass through first sealing means 29.

First sealing means 29 are fixed to the outer ring 3 and rest against the inner ring 2, while second sealing means 30 are fixed to the inner ring 2 and rest against the outer ring 3. These opposite arrangements form a labyrinth that improves the seal. In the case of pollutants pass through the free end of the lip 38 of first sealing means 29, the pollutants then face the fixed end of the lip 30 of second sealing means.

An annular sealing chamber 52 is defined between the first and second sealing means 29, 30. The chamber 52 may be provided with lubricant so as to form another seal barrier for the bearing 1.

The seal-tightness of the annular space between the inner 2 and outer 3 rings, in which the rows of rollers 4, 5 and 6 are situated, is ensured by the seal lip 26 at bottom inter-ring space 25 and the sealing assembly 28 at top inter-ring space 37.

Figure 2:
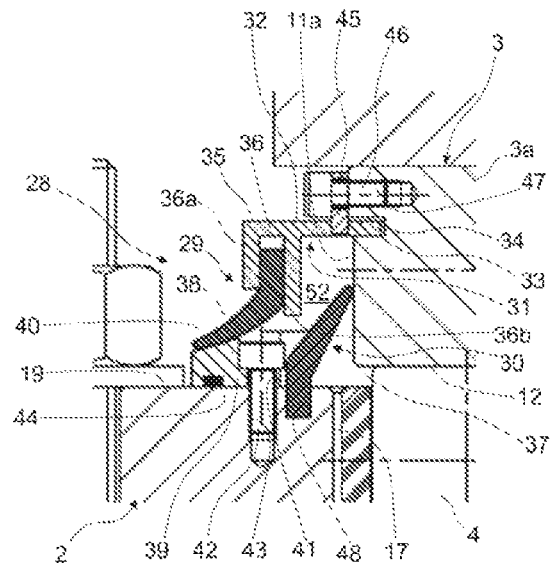
FIG. 2 is an enlarged sectional view of sealing means provided to the slewing roller bearing.
Figure 3:
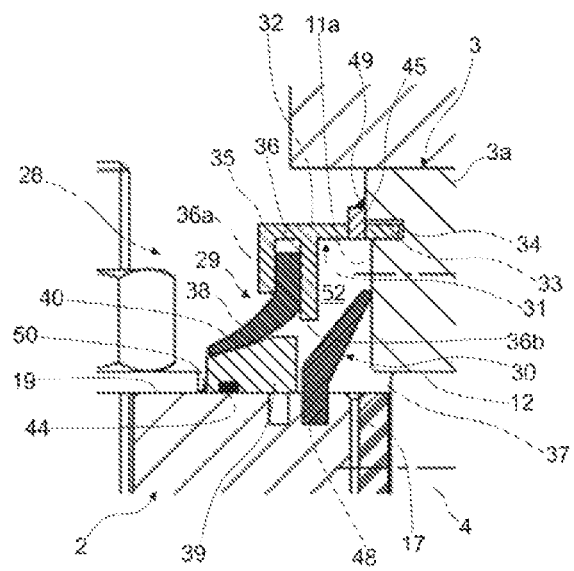
FIG. 3 is an enlarged sectional view of sealing means provided to a slewing roller bearing according to a second embodiment of the invention.

A second embodiment of the invention is illustrated in FIG. 3, wherein the same elements have the same references, and differs from the first embodiment of FIGS. 1 and 2 in that the first and second sealing means 29, 30 are welded to their respective support surfaces 11a, 19.

A welding line 49 is applied between an edge of the centering means 45 of the seal support ring 31 and the bore portion 11a of the outer ring 3.

A welding line 50 is applied between an edge of the contact ring 39 and the upper lateral surface 19 of inner ring 2.

The advantage of welding the contact ring 39 and the seal support ring 31 is to avoid the manufacture of threaded holes through the inner and outer rings 2, 3, to avoid the manufacture of through holes on the contact ring 39 and the seal support ring 31, and to avoid the use of screws 42, 46. This design is cost and material saving. Moreover, depending on the available space around the sealing assembly 28, welding lines 49, 50 can be applied in reduced spaces.

As a non-illustrated alternative, the centering portions 45 may axially extend towards the second sealing assembly 30 to enable axial space saving. In that case, the welding line may be applied directly to the junction portion between the support radial base 32 and the bore portion 11a.

In the above description, the slewing roller bearing provides three rows of rollers. Nevertheless, the present invention can be applied to a bearing provided with other rolling elements, such as balls. The present invention can also be applied to a rolling bearing with at least one row of rolling elements. The invention may also apply to a bearing without rolling elements interposed between the rings, as for a plain bearing or a ball joint for example. Moreover, the sealing elements may provide one or more sealing lips.

The invention claimed is:

1. A slewing bearing comprising:
   a first ring,
   a second ring, the rings being concentric around a central axis,
   at least one row of rolling elements arranged between the rings in order to form an axial thrust which can transmit axial forces,
   at least one row of rolling elements arranged between the rings in order to form a radial thrust which can transmit radial forces,
   at least one sealing assembly arranged between the first ring and the second ring,
   first sealing means with an annular seal support ring being fixed on a first sealing surface of first ring, and a sealing element providing at least one outer annular seal lip and being housed in a groove provided on the seal support ring, the seal lip resting on a contact ring provided on a second sealing surface of second ring, and
   second sealing means with at least one inner annular seal lip being housed in a groove provided on the second sealing surface of second ring and resting on the first sealing surface of first ring,
   the first sealing means being arranged outside second sealing means, and
   an annular sealed chamber being defined between the first sealing means and second sealing means.

2. The slewing bearing according to claim 1, wherein the annular sealed chamber means comprises lubricant.

3. The slewing bearing according to claim 1, wherein the seal support ring comprises an annular support base that provides a first end fixed to the first ring and a second end that includes the groove in which the sealing element is disposed.

4. The slewing bearing according to claim 1, wherein the seal support ring comprises at least one adjusting means having a contact surface resting against the first sealing surface so as to adjust the position of the seal support ring in a first direction with respect to the first ring.

5. The slewing bearing according to claim 4, wherein the seal support ring is fixed to the first ring by fixing means provided to the adjusting means resting against the first sealing surface.

6. The slewing bearing according to claim 1, wherein the seal support ring comprises at least one adjusting means housed in a groove provided to the first sealing surface so as to adjust the position of the seal support ring in a second direction with respect to the first ring.

7. The slewing bearing according to claim 1, wherein the contact ring is fixed to the second ring by welding.

8. The slewing bearing according to claim 1, wherein the contact ring is fixed to the second ring by threaded screws passing through holes provided on the contact ring, the screws cooperating with corresponding threaded holes provided on second sealing surface of the second ring.

9. The slewing bearing according to claim 1, wherein an annular sealing ring is housed between the contact ring and the second sealing surface of second ring.

* * * * *